US006685863B1

United States Patent
Yabushita et al.

(10) Patent No.: US 6,685,863 B1
(45) Date of Patent: Feb. 3, 2004

(54) AUTOMOTIVE INTERIOR COMPONENT AND METHOD FOR MANUFACTURING THE SAME

(75) Inventors: Shozo Yabushita, Kanagawa-ken (JP); Masatomo Ito, Kanagawa-ken (JP)

(73) Assignee: Kasai Kogyo Co., Ltd., Tokyo (JP)

( * ) Notice: Subject to any disclaimer, the term of this patent is extended or adjusted under 35 U.S.C. 154(b) by 0 days.

(21) Appl. No.: 09/163,203

(22) Filed: Sep. 30, 1998

(30) Foreign Application Priority Data

Nov. 19, 1997 (JP) .............................................. 9-318652

(51) Int. Cl.$^7$ .............................................. B29C 45/14
(52) U.S. Cl. ........................ 264/254; 264/266; 264/275; 264/328.8
(58) Field of Search .............................. 264/254, 255, 264/279, 279.1, 271.1, 259, 328.8, 275, 266

(56) References Cited

U.S. PATENT DOCUMENTS

| 5,053,179 A | * | 10/1991 | Masui et al. ................. 264/257 |
| 5,075,376 A | * | 12/1991 | Furuta et al. .................. 525/68 |
| 5,178,815 A | * | 1/1993 | Yokote et al. ............... 264/259 |
| 5,281,383 A | * | 1/1994 | Ueki et al. .................. 264/259 |
| 5,411,688 A | * | 5/1995 | Morrison et al. ........... 264/45.4 |
| 5,413,661 A | * | 5/1995 | Spengler et al. ............. 156/515 |
| 5,429,786 A | * | 7/1995 | Jogan et al. ................. 264/255 |
| 5,441,676 A | * | 8/1995 | Bigolin ........................ 264/25 |
| 5,582,789 A | * | 12/1996 | Stein et al. ................. 264/46.4 |
| 5,618,485 A | * | 4/1997 | Gajewski ..................... 264/255 |
| 5,679,301 A | * | 10/1997 | Miklas et al. ............... 264/161 |
| 5,750,612 A | * | 5/1998 | Zyagawa et al. ........... 524/451 |
| 6,109,645 A | * | 8/2000 | Totani et al. ............. 280/728.3 |

FOREIGN PATENT DOCUMENTS

| EP | 0692362 | * | 1/1996 |
| JP | 4-170452 | * | 6/1992 |

* cited by examiner

Primary Examiner—Edmund H. Lee
(74) Attorney, Agent, or Firm—Dickstein Shapiro Morin & Oshinsky LLP

(57) ABSTRACT

In an automobile interior component which is upholstered in a side-panel of a vehicle and its manufacturing method, in order to suppress the generation of sharp edged fragments in a collision for improving safety for vehicle occupants, high-impact-resistant core members with a rubber base ingredient are placed in an impact area and an interference area to interfere with other parts of the interior component. This avoids sharp-edged fragments being generated in a collision because of ductile breakdown of the high-impact-resistant core members enabling increased shock absorbing function and the use of inexpensive surface skin members as well.

7 Claims, 8 Drawing Sheets

AUTOMOTIVE INTERIOR COMPONENT AND METHOD FOR MANUFACTURING THE SAME

BACKGROUND OF THE INVENTION

1. Field of the Invention

The present invention relates to an automobile interior component which suppresses the generation of sharp-edged part fragments and the like when an automobile is impacted in a collision and the like in order to improve safety for vehicle occupants and to a manufacturing method for the component.

2. Description of the Related Art

In automobile side panels such as a door interior panel, a door trim is generally upholstered as an interior component.

Referring to FIGS. 13 and 14, a door trim 1 is composed of a laminated board including a resin core member 2 formed in a desired curved shape, having a shape-holding property, and a surface skin member 3 integrally attached to a part of the surface of the core member 2, having cushioning and decorative properties. The door trim is fixed to the inside of a door panel 4 which is a side panel of a body through such as a grip (not shown). In this door trim 1, an impact area (a) is provided where a shoulder, chest, waist, etc. of a vehicle occupant are likely to be impacted when a physical shock is applied from the side of the automobile, while an interference area (b) is set up for an area where the trim interferes with adjacent parts such as an instrumental pad.

For a forming method of the door trim 1, a mold press forming method is generally used in view of freedom in a product form and forming efficiency as shown in FIG. 15. This method is carried out by a mold press assembly essentially consist of a lower die 5 for mold press forming, an upper die 6 for mold press forming, and an injection molding device 7 connected to the lower die 5. When the lower die 5 and the upper die 6 are separated, the surface skin member 3 is set on the die surface of the upper die 6. Then, when the upper die 6 is lowered to the position that a predetermined clearance is defined between the upper and lower dies, resin material for a core member 2 is supplied by the injection molding device 7 through a gate 5a disposed at the lower die 5. After that, the upper die 6 is lowered to a bottom dead point, the core member 2 is formed into a required shape so that the core member 2 and the surface skin member 3 are integrally attached simultaneously. As for a conventional material for the core member of a door trim, a polypropylene resin with filler such as talc is used. In the impact area (a), the interference area (b), and rest portion, the same material has been used. Therefore, when a large physical shock is applied from the side of the automobile in a side collision, for example, there has been indications of the possibility of damage to the core member 2 and the generation of sharp-edged fragments of the component, in the impact area (a) where a shoulder, chest, and waist of a vehicle occupant are prone to be damaged and in the interference area (b) where the trim interferes with other parts such as an instrumental pad.

Accordingly, in order to prevent the generation of sharp-edged fragments, a special configuration for the surface skin member 3 is necessary, such as backing a sheet having a barrier property with the conventional surface skin member. This results in increasing the cost of the surface skin member, which is a problem in the overall automobile cost.

Since the conventional core member does not have a shock-absorbing property in the impact area (a) and the interference area (b), it has been urgently necessary to provide a shock-absorbing property in the specially required portions of the door trim 1.

SUMMARY OF THE INVENTION

In view of the above-mentioned problems, it is an object of the present invention to provide an improved interior component for a side panel of an automobile and its manufacturing method. More specifically, it is an object of the invention to provide an interior component and the method for manufacturing thereof, in which an increased shock-absorbing property and a reliable preventive property against the generation of sharp-edged fragments of the component are provided in the impact area where a shoulder, chest, and waist of a vehicle occupant are prone to be damaged and in the interference area where the trim interferes with other parts such as an instrumental pad. Since this component is capable of effectively absorbing the shock on the vehicle occupants and reliably preventing generation of sharp-edged fragments as well, generally used surface skin material can be used resulting in reduced cost.

In order to achieve the aforementioned object, according to a first aspect of the present invention, there is provided an interior component for an automobile, comprising: a core member formed into a desired shape, having a shape-holding property; and a surface skin member integrally attached on the part of the surface of the core member, wherein in the core member, high-impact resistant core members with a rubber-base ingredient are disposed at least either an impact area where a shock load is concentrated in a collision or an interference area to interfere with other parts.

It is preferable that as material for the core member for general portions, a thermoplastic resin with filler such as a polypropylene resin with talc be generally used, and as resin material for the high-impact-resistant core member, a polypropylene resin with talc and a rubber-base ingredient, for example, be used wherein the material is prepared so that the talc content is 10 to 15 parts by weight and the rubber base ingredient content is 20 to 30 parts by weight to the total weight.

In accordance with second aspect of the present invention, there is provided an interior component for an automobile, comprising: an injection molded object of a synthetic resin which is upholstered in a side-panel of a vehicle, wherein in the interior component, high-impact resistant core members with a rubber-base ingredient are disposed at least either an impact area where a shock load is concentrated at a collision or an interference area to interfere with other parts.

In this case, in the automobile interior component comprising a molded resin object, the high-impact resistant core members are also placed in the impact area and/or the interference area to interfere with other parts.

In accordance with third aspect of the present invention, there is provided a manufacturing method of the interior component, comprising the steps of: supplying resin material for a core member for general portions through gates disposed in the lower die of a mold press assembly for mold press forming, to predetermined portions of a lower die for mold press forming, and simultaneously dividing and supplying high-impact resistant resin material through a gate, to at least either a portion of the lower die corresponding to an impact area of the interior component or a portion of the lower die corresponding to an interference area of the interior component to interfere with other parts; and an upper die for mold press forming, where a surface skin member is set in advance, is brought into engagement with and urged to the lower die for mold press forming, whereby high-impact resistant core members are formed in portions of the interior component corresponding to the impact area and the interference area to interfere with other parts.

While one of two injection molding devices connected to the lower die for mold press forming supplies resin material for the core member for general portions to the predetermined portions of the lower die surface through the gates, the other injection molding device supplies the high-impact-resistant resin material to the impact area and/or to the interference area to interfere with other parts through the gate.

As resin material for general portions of the core member, a general purpose thermoplastic resin with filler such as a polypropylene resin with talc is generally used, and as high-impact-resistant resin material, a resin with a rubber base ingredient is used.

As for the timing for supplying from two injection molding devices, they may be simultaneous or sequential. Timing may be appropriately adjusted, in consideration of an occupied space of each area and MI values of resins, etc.

In accordance with another aspect of the present invention, there is provided a manufacturing method wherein concave channels are formed on the die surface of the lower die for mold press forming along the boundary portions between the resin material for the core member for general portions and the high-impact resistant resin material for the high-impact-resistant core member.

In accordance with fourth aspect of the present invention, there is further provided a manufacturing method of an interior part for an automobile, comprising the steps of: setting a surface skin member to an upper die for mold press forming, and setting high-impact-resistant core members preformed into desired shape to portions of a lower die for mold press forming corresponding to an impact area and an interference area to interfere with other parts simultaneously; and supplying resin material for a core member to a die surface of the lower die for mold press forming through gates disposed in the lower die for mold press forming, whereby the high-impact-resistant core members are formed in the impact area and the interference area to interfere with other parts of the interior part by engaging and urging of the upper and lower dies for mold press forming.

In accordance with fifth aspect of the present invention, there is finally provided a manufacturing method of an automobile interior component composed of an injection molded object of a synthetic resin which is upholstered in a side-panel of a vehicle, comprising the steps of: injection-filling resin material for a core member for general portions into cavities defined between upper and lower dies for mold press forming; and then injection-filling high-impact resistant resin material for high-impact-resistant core members in portions corresponding to an impact area and an interference area to interfere with other parts, whereby the high-impact-resistant core members are embedded into the core member for general portions.

As is apparent from the above-mentioned configurations, since a high-impact-resistant core member is used in the impact area where a shock load is concentrated and in the interference area where the trim interferes with other parts, the shock load can be effectively absorbed and sharp-edged fragments from rupture of the core member can be suppressed when a side shock load is applied.

DESCRIPTION OF THE PREFERRED EMBODIMENTS

Hereinbelow embodiments will be described in detail in which an automobile interior component and its manufacturing method according to the present invention are applied to an automobile door trim and its manufacturing method, referring to the attached drawings.

Figure 1:
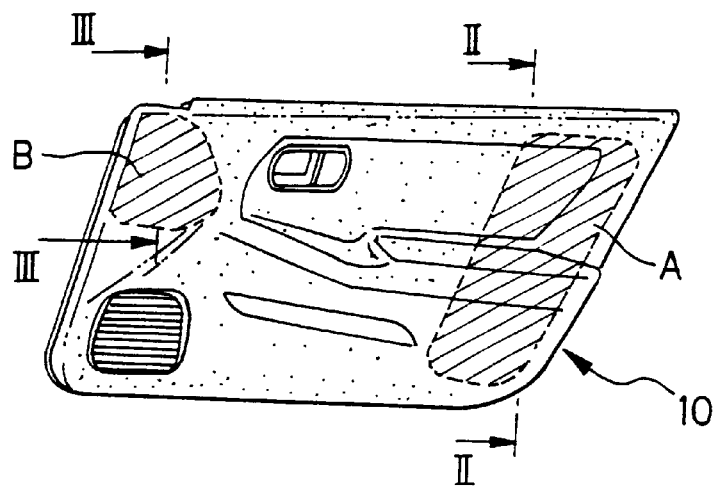
FIG. 1 is a front view illustrating an embodiment in which an automobile interior component according to the present invention is applied to a door trim.
Figure 2:
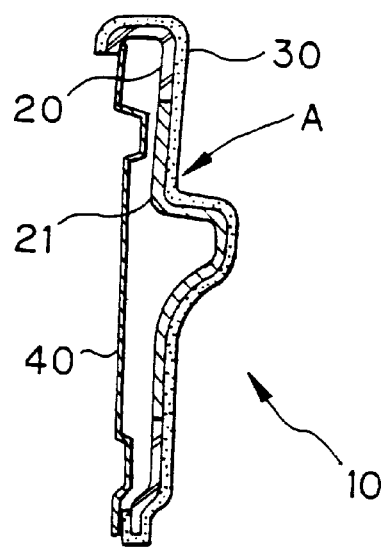
FIG. 2 is a section view at the line II—II of FIG. 1.
Figure 3:
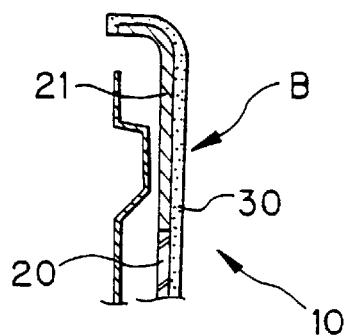
FIG. 3 is a section view at the line III—III of FIG. 1.
Figure 4:
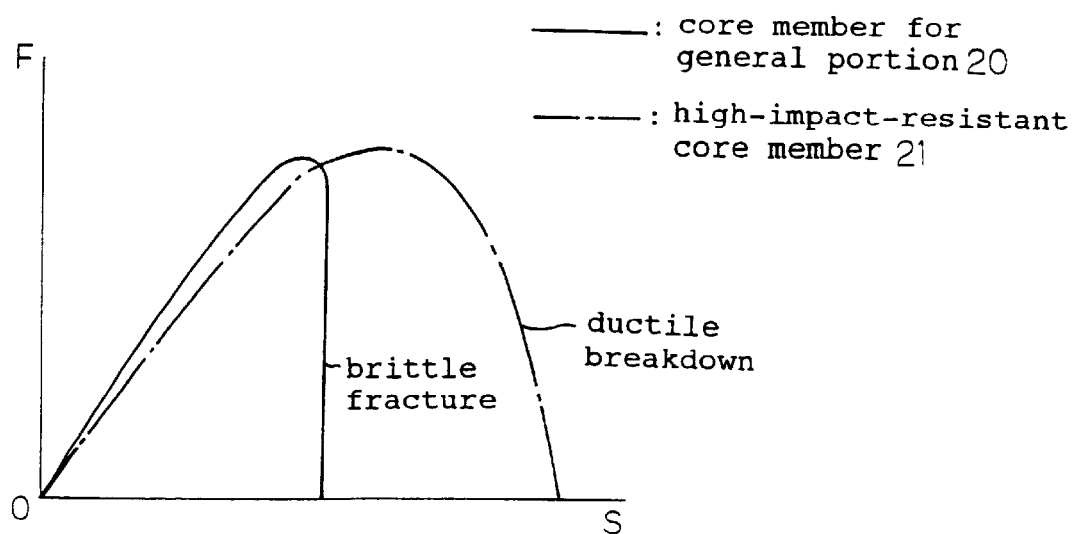
FIG. 4 is a graph illustrating shock-absorbing function of a core member for general portions in contrast with that of a high-impact-resistant core member of the door trim.
Figure 5:
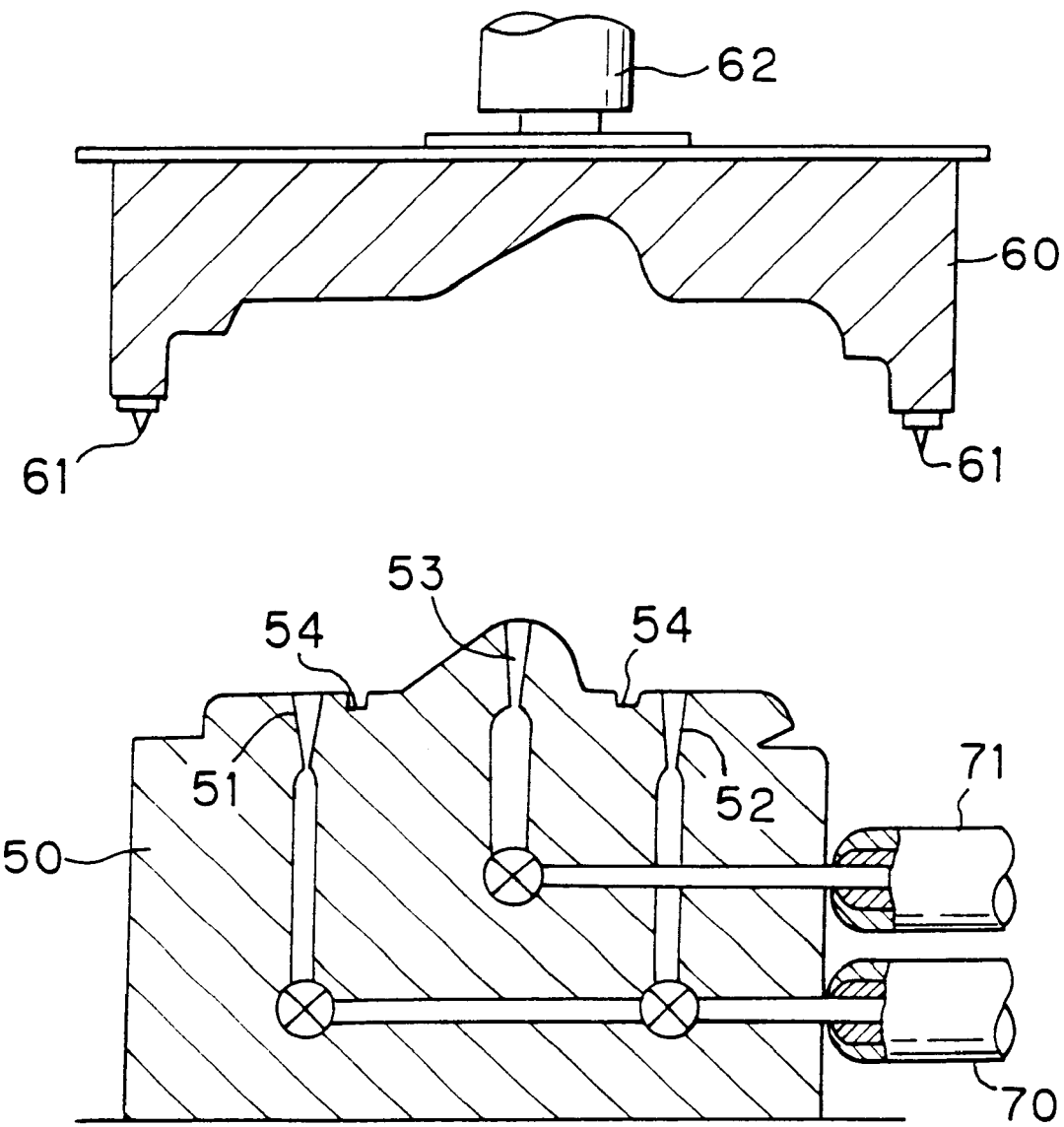
FIG. 5 is a section view illustrating a die assembly structure for use in manufacturing of a door trim in FIG. 1.
Figure 6:
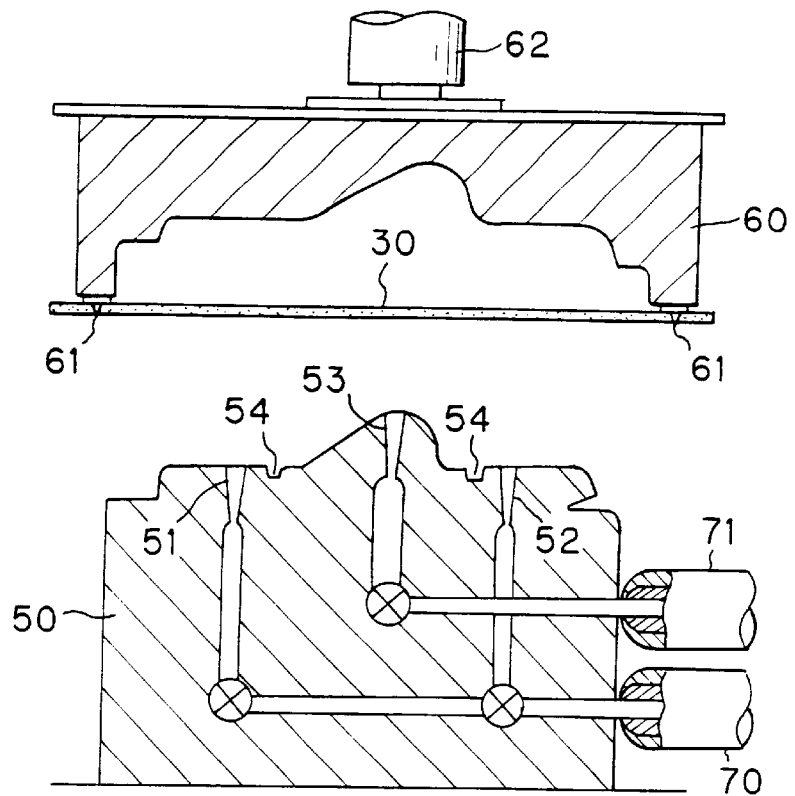
FIG. 6 is a section view illustrating a set process of a surface skin member in manufacturing of a door trim in FIG. 1.
Figure 7:
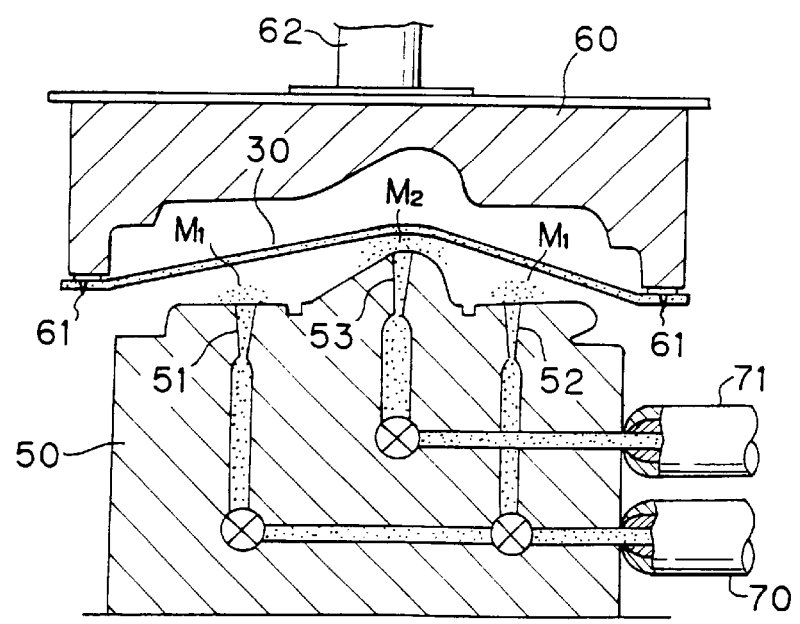
FIG. 7 is a section view illustrating a supplying process of resin material in manufacturing of a door trim in FIG. 1.
Figure 8:
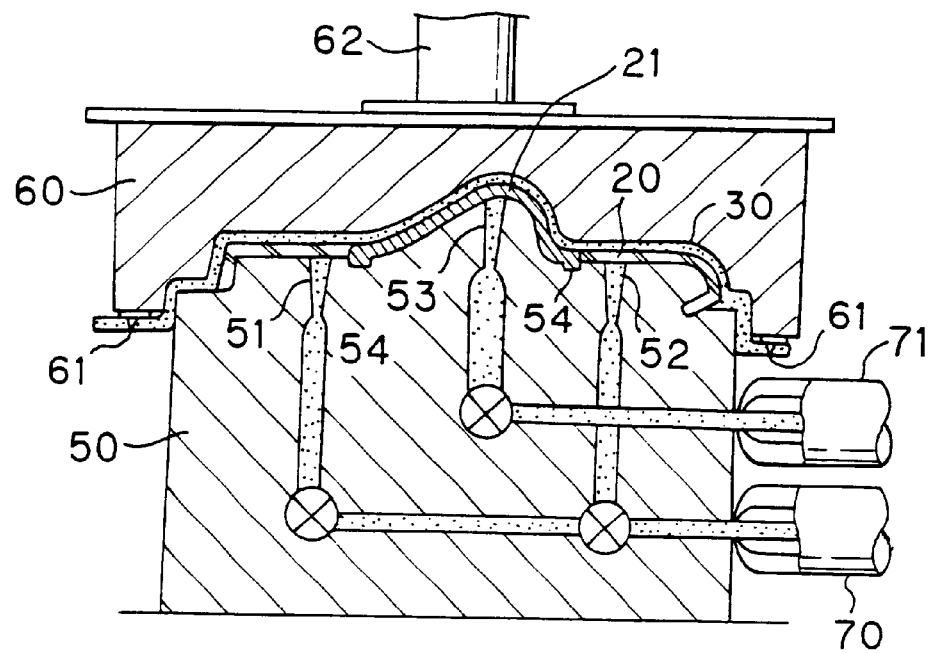
FIG. 8 is a section view illustrating a formation process of a molding press in a manufacturing method of a door trim in FIG. 1.
Figure 9:
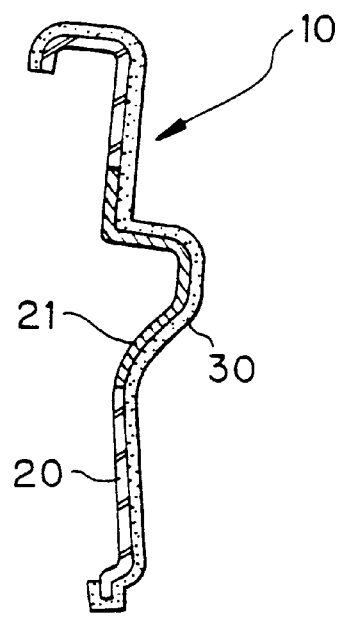
FIG. 9 is a section view illustrating a modified first embodiment in which an automobile interior component according to the present invention is applied to a door trim.
Figure 10:
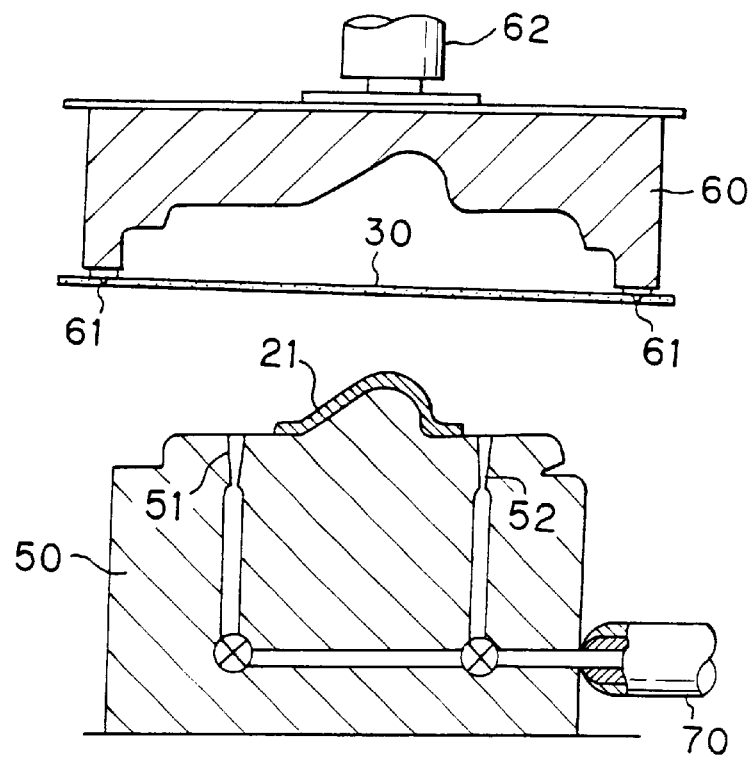
FIG. 10 is a section view illustrating a molding press process for a door trim in FIG. 9.

FIG. 1 is a front view illustrating an embodiment according to the present invention; FIGS. 2 and 3 are longitudinal sectional views illustrating a formation of the automobile door trim respectively; FIG. 4 is a graph illustrating a shock-absorbing function of a core member for general portions in comparison with that of a high-impact-resistant core member of the door trim; FIG. 5 is a section view illustrating a die assembly for forming the automobile door trim; FIGS. 6 to 8 are section views illustrating a forming process of the automobile door trim respectively; FIGS. 9 and 10 are section views illustrating a modified embodiment of the automobile door trim; and FIG. 10 is a section view illustrating a forming process for the automobile door trim of the modified embodiment.

Figure 11:
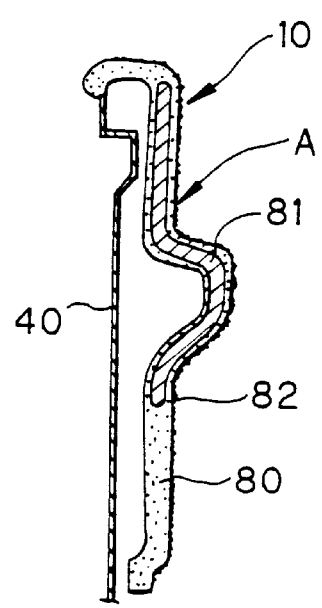
FIG. 11 is a section view illustrating a second embodiment in which an automobile interior component according to the present invention is applied to a door trim.
Figure 12:
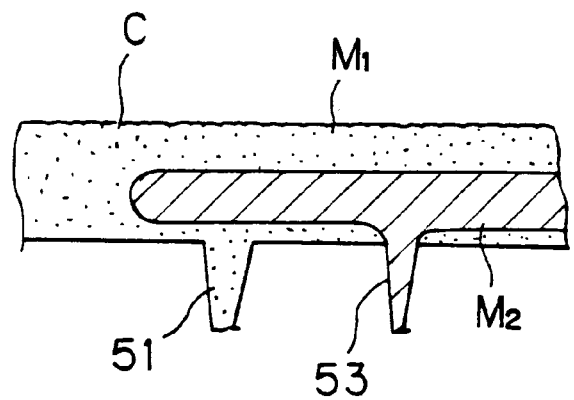
FIG. 12 is a schematic representation showing a formation process of a door trim in FIG. 11.
Figure 13:
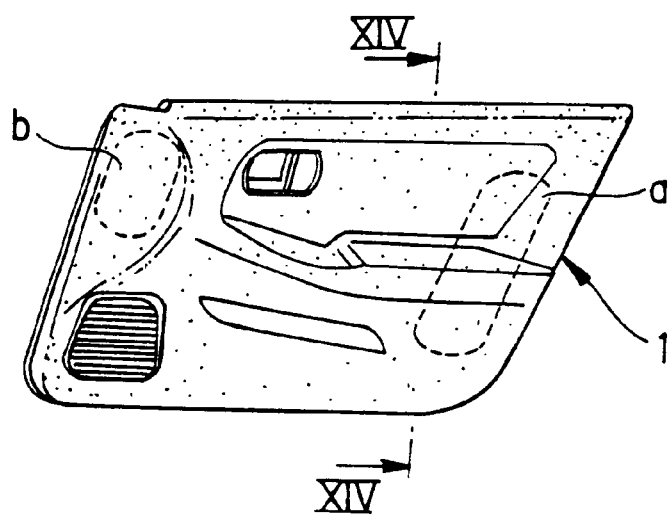
FIG. 13 is a front view illustrating a conventional automobile door trim.
Figure 14:
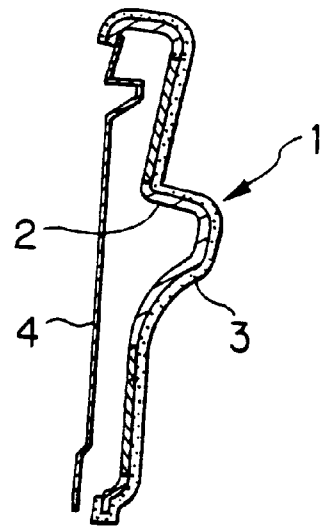
FIG. 14 is a section view at the line XIV—XIV of FIG. 13.
Figure 15:
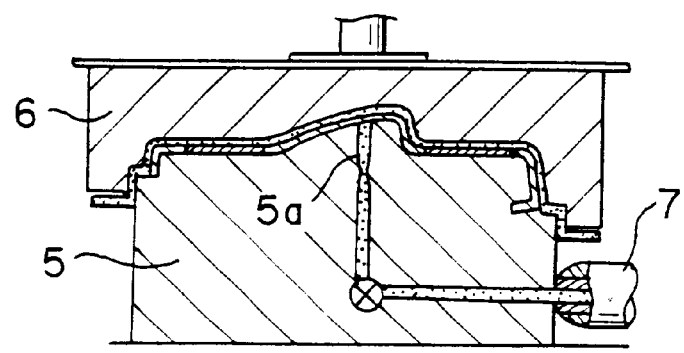
FIG. 15 is a section view illustrating a molding press process for a conventional door trim.

FIGS. 11 and 12 illustrate a second embodiment of the invention, wherein FIG. 11 is a section view illustrating a formation of the automobile door trim while FIG. 12 is a schematic representation of a forming process.

Referring to FIGS. 1 to 8, there is shown an embodiment in which an interior component according to the present invention is applied to an automobile door trim.

As shown in FIGS. 1 to 3, an automobile door trim 10 comprises a resin core member 20 formed into a desired curvature shape and a surface skin member 30 are integrally attached on the surface of the core member 20, and is fixed to the inside of a door inner panel 40 by a fixing means such as a grip (not shown).

In further detail, in an impact area (A) where a shoulder, chest, and waist of a vehicle occupant are prone to be damaged when a physical shock is applied from the side of the automobile, and in an interference area (B) where the trim interferes with an instrumental pad, it is designed such that a high-impact-resistant core member 21 is substituted for the resin core member 20 for general portions.

While as material for the core member 20 for general portions a generally used thermoplastic resin with filler such as a polypropylene resin with talc is used in this embodiment, and as material for the high-impact-resistant core member 21, a polypropylene resin with talc and a rubber-base composite as filler is used, wherein the material is prepared so that the talc content is 10 to 15 parts by weight and the rubber base composite content is 20 to 30 parts by weight of the total weight.

As for the shock-absorbing functions of the core member for general portions 20 and the high-impact-resistant core member 21, as will be apparent from the graph in FIG. 4, while brittle fracture can be produced in the core member for general portions 20, a ductile breakdown is induced in the high-impact-resistant core member 21 so that shock can be effectively absorbed and also the generation of sharp edged fragments can be suppressed in the impact area (A) and the interference area (B). Accordingly, this eliminates expensive countermeasures against the sharp-edged fragments in the skin member 30 enabling use of an inexpensive generally used skin member 30 which is economically advantageous.

A method for manufacturing the door trim 10 will now be described. A forming machine generally comprises, as shown in FIG. 5, a lower die 50 for mold press forming, an upper die 60 for mold press forming, which can be engaged and opened mutually, and two injection molding devices 70 and 71 connected to the lower die 50 for mold press forming.

In more detail, the lower die 50 for mold press forming includes a die surface having a curvature corresponding to that of the door trim 10, and gates 51, 52, and 53 which are passages for resin material supplied by the two injection molding devices 70 and 71. The upper die 60 for mold press forming is provided with set pins in the periphery portion for setting the skin member 30 and with an elevator cylinder 62, thereby enabling the upper die to travel up and down in a predetermined stroke.

As for the two injection molding devices 70 and 71, while one injection molding device 70 supplies resin material M1 for the core member for general portions 20 to the predetermined portions of the lower die surface through the gates 51 and 52, the other injection molding device 71 supplies the high-impact-resistant resin material M2 to the portions corresponding to the impact area (A) and the interference area (B) through the gate 53.

When the upper and lower dies 50 and 60 for mold press forming are in an open state, as shown in FIG. 6, the surface skin member 30 is set to the set pins 61 of the upper die 60. Then, as shown in FIG. 7, when the upper die 60 moves down by a predetermined stroke by the motion of the elevator cylinder 62 until the clearance between the upper and lower dies 50 and 60 is reduced to 10 to 50 mm, the two injection molding devices 70 and 71 supply with resin materials M1 and M2 respectively. Afterward, the upper die moves further down to the dead bottom point to form the core member 20 and the high-impact-resistant core members 21 into the desired shape and also to integrally attached the surface skin member 30 to the part of the surface thereof.

Thus, the forming of the automobile door trim 10 as shown in FIGS. 1 to 3 is completed.

At the forming thereof, when a concave channel 54 is formed on the lower die surface 50 along the boundary portion between the core member for general portions 20 and the high-impact-resistant core member 21 to precisely supply the impact area (A) and the interference area (B) with the high-impact-resistant resin material M2, resin material M1 for the core member for general portions 20 does not break into the impact area (A) and the interference area (B) and the high-impact-resistant resin material M2 also does not break into the core member for general portions 20 side. This allows precise formation.

FIGS. 9 and 10 illustrate a modified embodiment of the above-mentioned embodiment. As for the high-impact-resistant core member 21, a plate-like member preformed into a desired shape is used. The lower die 50 for mold press forming is only connected to one injection molding device 70.

When the skin member 30 is set to the upper die 60, the high-impact-resistant core members 21 are set to the lower die surface 50 simultaneously. Then, the resin material M1 for the core member for general portions 20 is supplied from the injection molding device 70 engaging the dies at the same time to perform a mold press forming. Thus, the forming of the door trim 10 as shown in FIG. 9 is completed.

In this embodiment, there are advantages in that the forming machine is simplified by eliminating one injection molding machine 71 and also enabling precise setting of the high-impact-resistant core members 21 at requisite portions for impact-resistance because the high-impact-resistant core member 21 is preformed into a desired shape.

FIGS. 11 and 12 illustrate a second embodiment according to the present invention, and this embodiment is also applied to the automobile door trim, having a feature of a skin-less structure.

That is, the door trim 10 to be upholstered inside of a door panel 40 is composed of a single injection molded object of a synthetic resin including a core member for general portions 80 and high-impact-resistant core members 81 embedded in the ore member 80. The high-impact-resistant core members 81 are embedded at the portions corresponding to the impact area (A) and the interference area (B) and stripes 82 are formed on the front surface of the core member for general portions 80 for an effective design.

In this embodiment, as shown in FIG. 12, after the resin material M1 for general portions is filled into cavities C through the gate 51 to form the core member for general portions 80, the high-impact-resistant resin material M2 is injected from the gate 53 so that the high-impact-resistant resin material M2 is formed so as not to be positioned on the surface of the product. This can be applied to an automobile door trim of a skin-less structure. There is an advantage in supplying a reduced-cost door trim having an increased shock-absorbing function.

Although the aforementioned embodiments are applied to the automobile door trim 10, they can be also applied to any trim to be formed in a vehicle side panel such as a rear corner trim.

Thus, the advantages of the present invention may be summarized as given in the following.

(1) By providing high-impact resistant core member in an impact area and/or in an interference area to interfere with other parts, the shock load can be effectively absorbed by ductile breakdown of the high-impact resistant core member and thereby the shock on the vehicle occupants can be suppressed when a large physical shock is applied from the side of an automobile in a side collision.

(2) By providing high-impact resistant core member in an impact area and/or in an interference area to interfere with other parts, the generation of sharp-edged fragments can be effectively prevented and thereby generally used surface skin material without special configuration can be used, which results in possibility of selection of various surface skin materials and in reducing the material cost.

(3) According to the second embodiment of the present invention, an interior component having a feature of a skinless structure, which high-impact-resistant core members are embedded in portions corresponding to an impact area and an interference area to interfere with other parts, may obtain flexible product shape with an increased shock-absorbing function and product cost can be reduced, accordingly.

(4) By providing concave channel on the lower die surface along the boundary portion between the core member material for general portions and the high-impact-resistant material core members, two materials do not break into respective areas and thereby precise formation can be carried out.

(5) By setting high-impact-resistant core members preformed into a desired shape to portions of a lower die for mold press forming and performing an insert-injection process for injection molding thereto, forming apparatus can be simplified and precise forming can be carried out.

What is claimed is:

1. A manufacturing method for forming an interior vehicle component having an impact area and an interference area, said method comprising the steps of:
    setting a skin member on a die surface of an upper die of a mold press;
    lowering said upper die in a predetermined stroke toward a lower die; and
    forming a core member in contact with said skin member by supplying a first resin for a first portion of said core member to first predetermined portions of said lower die through a gate disposed in said lower die and supplying a second high-impact resistant resin, different from said first resin, to second predetermined portions of said lower die for a second portion of said core member, different from said first portion of said core member, said second portion of said core member corresponding to said impact area and/or said interference area, said second high-impact resistant resin having a ductile breakdown property that enables effective shock-absorption and suppression of the generation of sharp-edged fragments in said impact area and/or said interference area, wherein said first and second portions of said core member are in contact with said skin member, and wherein said first resin and said second high-impact resistant resin are injected simultaneously.

2. A manufacturing method according to claim 1, wherein concave channels are formed on the die surface of said lower die for mold press forming along boundary portions between said first resin material and said second high-impact resistant resin material, said concave channels preventing said first resin material and second resin material from breaking into each other.

3. A manufacturing method for an interior vehicle component having an impact area and an interference area, comprising the steps of:
    supplying a first resin material for a first portion of a core member to a first portion of a lower die and supplying to a second portion of said lower die a second resin material, different from said first resin material, for a second portion of said core member corresponding to said impact area and/or said interference area of said core member and different from said first portion of said core member, said second resin material having a ductile breakdown property that enables effective shock-absorption and suppression of the generation of sharp-edged fragments in said impact area and/or said interference area, wherein said first resin and said second resin are injected simultaneously.

4. A manufacturing method for forming an interior vehicle component having an impact area and an interference area, said method comprising the steps of:
    setting a skin member on a die surface of an upper die of a mold press;
    lowering said upper die in a predetermined stroke toward a lower die; and
    forming a core member in contact with said skin member by supplying a first resin for a first portion of said core member to first predetermined portions of said lower die through a gate disposed in said lower die and supplying a second high-impact resistant resin, different from said first resin, to second predetermined portions of said lower die for a second portion of said core member, different from said first portion of said core member, said second portion of said core member corresponding to said impact area and/or said interference area, wherein said first and second portions of said core member are in contact with said skin member,
    said second high-impact resistant resin having a ductile breakdown property derived from a second resin composition comprising a polypropylene resin, from approximately 10 to approximately 15 parts by weight talc, and from approximately 20 to approximately 30 parts by weight rubber base composite, wherein said ductile breakdown property enables effective shock-absorption and suppression of the generation of sharp-edged fragments in said impact area and/or said interference area.

5. A manufacturing method as in claim 4, wherein said first resin and said second high-impact resistant resin are injected simultaneously.

6. A manufacturing method for an interior vehicle component having an impact area and an interference area, comprising the steps of:
    supplying a first resin material for a first portion of a core member to a first portion of a lower die and supplying to a second portion of said lower die a second resin material, different from said first resin material, for a second portion of said core member corresponding to said impact area and/or said interference area of said core member and different from said first portion of said core member,
    said second resin material having a ductile breakdown property derived from a composition comprising a polypropylene resin, from approximately 10 to approximately 15 parts by weight talc, and from approximately 20 to approximately 30 parts by weight rubber base composite, wherein said ductile breakdown property enables effective shock-absorption and suppression of the generation of sharp-edged fragments in said impact area and/or said interference area.

7. A manufacturing method as in claim 6, wherein said first resin and said second resin material are injected simultaneously.

* * * * *